United States Patent
Bentz et al.

(10) Patent No.: US 9,016,242 B2
(45) Date of Patent: *Apr. 28, 2015

(54) APPARATUS FOR PREVENTING ENTANGLEMENT OF A PAIR OF LINES FED FROM SEPARATE REELS

(75) Inventors: Christopher Bentz, Wilmington, NC (US); Garet Itz, Austin, TX (US); Weston Petersen, Austin, TX (US)

(73) Assignee: Parks/Bentz IP Holdings, LLC, Wilmington, NC (US)

( * ) Notice: Subject to any disclaimer, the term of this patent is extended or adjusted under 35 U.S.C. 154(b) by 445 days.

This patent is subject to a terminal disclaimer.

(21) Appl. No.: 12/522,348

(22) PCT Filed: Jan. 12, 2009

(86) PCT No.: PCT/US2009/000186
§ 371 (c)(1),
(2), (4) Date: Mar. 18, 2011

(87) PCT Pub. No.: WO2009/089071
PCT Pub. Date: Jul. 16, 2009

(65) Prior Publication Data
US 2011/0163195 A1    Jul. 7, 2011

Related U.S. Application Data

(63) Continuation-in-part of application No. 12/008,701, filed on Jan. 11, 2008, now Pat. No. 7,980,202.

(51) Int. Cl.
*A01K 27/00* (2006.01)
*B65H 75/30* (2006.01)
*B65H 75/40* (2006.01)
*B65H 75/44* (2006.01)

(52) U.S. Cl.
CPC ............ *A01K 27/004* (2013.01); *B65H 75/406* (2013.01); *B65H 75/4402* (2013.01)

(58) Field of Classification Search
USPC ......................................... 119/792, 794–798
See application file for complete search history.

(56) References Cited

U.S. PATENT DOCUMENTS 2,314,504 A   3/1943   Lifchultz
3,198,175 A   8/1965   Dean
(Continued)

FOREIGN PATENT DOCUMENTS

WO    WO-2006/099431    9/2006

OTHER PUBLICATIONS

Product Catalog: "Water-fun products and accessories for you and your pet," 2010, 7 pages, Paws Aboard, LLC, Tampa, Florida, www.pawsaboard.com.

(Continued)

*Primary Examiner* — David Parsley
(74) *Attorney, Agent, or Firm* — Venable LLP; Steven J. Schwarz

(57) ABSTRACT

A multi-reel, line-handling apparatus can include a housing, a shaft located within the housing, the shaft defining a shaft axis, a first reel located within the housing, the first reel rotatably mounted to the shaft about a first reel axis angled with respect to the shaft axis, and a second reel located within the housing, the second reel rotatably mounted to the shaft about a second reel axis angled with respect to the shaft axis. The first reel and the second reel can be rotatable with respect to the housing about the shaft axis.

12 Claims, 14 Drawing Sheets

(56) References Cited

U.S. PATENT DOCUMENTS

| | | | |
|---|---|---|---|
| 3,250,253 A | 5/1966 | Galin | |
| 3,477,410 A | 11/1969 | Lettieri | |
| 3,693,596 A | 9/1972 | Croce et al. | |
| 3,776,198 A | 12/1973 | Gehrke | |
| 3,853,283 A | 12/1974 | Croce et al. | |
| 4,018,189 A | 4/1977 | Umphries et al. | |
| 4,165,713 A | 8/1979 | Brawner et al. | |
| 4,328,766 A | 5/1982 | Deibert | |
| 4,328,767 A | 5/1982 | Peterson | |
| 4,501,230 A | 2/1985 | Talo | |
| 4,887,551 A | 12/1989 | Musetti | |
| 4,964,370 A | 10/1990 | Peterson | |
| 5,377,626 A | 1/1995 | Kilsby et al. | |
| 5,483,926 A | 1/1996 | Bogdahn | |
| 5,489,010 A | 2/1996 | Rogers | |
| 5,595,143 A | 1/1997 | Alberti | |
| 5,701,981 A * | 12/1997 | Marshall et al. | 191/12.4 |
| 5,890,456 A | 4/1999 | Tancrede | |
| 6,003,472 A | 12/1999 | Matt et al. | |
| 6,024,054 A | 2/2000 | Matt et al. | |
| 6,148,773 A | 11/2000 | Bogdahn | |
| 6,474,270 B1 | 11/2002 | Imes | |
| 6,526,918 B1 | 3/2003 | Arnold | |
| 6,648,261 B2 | 11/2003 | Irving | |
| 6,712,026 B1 | 3/2004 | Carville, Jr. | |
| 6,792,893 B1 | 9/2004 | Quintero et al. | |
| 6,845,736 B1 | 1/2005 | Anderson | |
| 6,886,499 B2 | 5/2005 | Meissner | |
| 6,904,872 B2 | 6/2005 | Muller | |
| 6,912,975 B1 | 7/2005 | Balan | |
| 7,017,527 B2 | 3/2006 | Price | |
| 7,036,459 B1 | 5/2006 | Mugford et al. | |
| 7,040,257 B2 | 5/2006 | Waxman et al. | |
| 7,131,401 B2 | 11/2006 | Huff et al. | |
| 7,168,393 B2 | 1/2007 | Bogdahn et al. | |
| 7,207,296 B2 | 4/2007 | DiDonato | |
| 7,455,034 B2 * | 11/2008 | DiDonato | 119/796 |
| 7,980,202 B2 * | 7/2011 | Bentz et al. | 119/796 |
| 2003/0042350 A1 | 3/2003 | Irving | |
| 2003/0145803 A1 | 8/2003 | Muller | |
| 2004/0154556 A1 | 8/2004 | Masterson et al. | |
| 2004/0237906 A1 | 12/2004 | Waxman et al. | |
| 2004/0237907 A1 | 12/2004 | Muller | |
| 2005/0011472 A1 | 1/2005 | Wuensche | |
| 2005/0103282 A1 | 5/2005 | Huff et al. | |
| 2005/0211189 A1 | 9/2005 | Price | |
| 2005/0263103 A1 | 12/2005 | Updyke et al. | |
| 2006/0144343 A1 | 7/2006 | Price | |
| 2006/0185619 A1 | 8/2006 | Fei | |
| 2006/0201449 A1 | 9/2006 | DiDonato | |
| 2006/0236956 A1 | 10/2006 | Lord | |
| 2007/0022975 A1 | 2/2007 | Arnold | |
| 2007/0039560 A1 | 2/2007 | Smith | |
| 2007/0131177 A1 | 6/2007 | Perkitny | |
| 2007/0204806 A1 | 9/2007 | Hurwitz | |
| 2008/0000433 A1 | 1/2008 | DiDonato | |
| 2008/0017134 A1 | 1/2008 | Robley et al. | |
| 2009/0120376 A1 | 5/2009 | Foster | |
| 2009/0178627 A1 | 7/2009 | Bentz et al. | |
| 2011/0180017 A1 | 7/2011 | Goldenberg | |
| 2011/0314638 A1 | 12/2011 | Patt et al. | |

OTHER PUBLICATIONS

International Search Report dated Mar. 9, 2009 from PCT/US2009/000186.

* cited by examiner

APPARATUS FOR PREVENTING ENTANGLEMENT OF A PAIR OF LINES FED FROM SEPARATE REELS

CROSS-REFERENCE TO RELATED APPLICATIONS

The present application is the U.S. National Stage of International Application No. PCT/US2009/000186, filed in the United States on Jan. 12, 2009, which claims priority to, and is a continuation-in-part of, U.S. application Ser. No. 12/008, 701, filed on Jan. 11, 2008 now U.S. Pat. No. 7,980,202. The entire contents of the foregoing applications are expressly incorporated herein by reference.

TECHNICAL FIELD

The present invention relates generally to a line-handling apparatus, and more particularly, to a hand-help apparatus for preventing entanglement of two or more lines fed from reels.

BACKGROUND

U.S. Patent Application Publication No. 2006/0201449 A1 to DiDonato discloses a no-tangle two dog retractable leash with flashlight. The device includes a housing containing a pair of spools, each having a leash secured thereto. The spools rotate about an axle to allow each leash to unwind from, or rewind onto, its respective spool. Both ends of the axle are attached to the housing, thereby fixing the axle in place inside the housing. A handle is attached to the housing by a shaft that allows the handle to pivot with respect to the housing about an axis extending transversely to the axle. Since the axle is fixed in place inside the housing, when one leash crosses over the other leash, the housing rotates with respect to the handle (held stationary in a user's hand) in order to uncross the leashes from one another. The rotation of the housing with respect to the handle in order to uncross the leashes detracts from the operation of the device.

The device disclosed in U.S. Patent Application Publication No. 2006/0201449 also includes a brake pad that can be operated by a user by pressing a push pad. The brake pad is arranged to simultaneously engage both spools when the user presses the push pad, thereby stopping both spools simultaneously. This arrangement prevents the user from stopping one spool independently from the other, for example, when an animal attached to one leash needs to be stopped, but the animal attached to the other leash does not.

SUMMARY

According to an illustrative aspect of the present invention, a multi-reel, line-handling apparatus comprises: a housing; a shaft located within the housing, the shaft defining a shaft axis; a first reel located within the housing, the first reel rotatably mounted to the shaft about a first reel axis angled with respect to the shaft axis; and a second reel located within the housing, the second reel rotatably mounted to the shaft about a second reel axis angled with respect to the shaft axis; wherein the first reel and the second reel are rotatable with respect to the housing about the shaft axis.

According to another illustrative aspect of the present invention, a multi-reel, line-handling apparatus comprises: a housing; a handle coupled to the housing; a first reel located within the housing, the first reel rotatable about a first reel axis; a second reel located within the housing, the second reel rotatable about a second reel axis; a first brake associated with the first reel; and a second brake associated with the second reel; wherein actuation of the first brake stops rotation of the first reel while allowing rotation of the second reel, and actuation of the second brake stops rotation of the second reel while allowing rotation of the first reel.

According to another illustrative aspect of the present invention, a multi-reel, line-handling apparatus, comprises: a housing; a first reel located within the housing, the first reel rotatable about a first axis; a second reel located within the housing, the second reel rotatable about a second axis; and means for mounting the first reel and the second reel within the housing, such that the first reel and the second reel are rotatable with respect to a third axis that is angled with respect to the first axis and the second axis.

According to another illustrative aspect of the invention, a multi-reel, line-handling apparatus comprises at least two reels mounted on a straight rotatable shaft. The reels and the shaft can comprise a rotatable assembly. The axis of the shaft lies along a shaft axis of the apparatus. When the shaft rotates about that shaft axis, it carries with it the assembly and the reels mounted thereon. If the lines payed out from the reels tend to become twisted, rotation of the assembly in the same direction as the twisting causes the lines to untwist. Each reel has a reel brake. Each reel brake tends to restrict rotation of its reel about the reel's own axis, thereby controlling the paying out of the line wound on the reel. But applying the reel brake does not restrict the rotation of the assembly about the shaft axis. This lack of restriction permits the assembly to rotate freely and continue untwisting the lines essentially independently of the degree of reel brake application.

According to another illustrative aspect of the invention, a multi-reel, line-handling apparatus comprises at least two reels, each reel being individually positionable and rotatable about its own axis of rotation. On each reel is wound a line having one end anchored to the reel on which it is wound and an opposite end adapted for fastening to an object. The apparatus has a rotatable assembly that rotates about a shaft axis, wherein the rotating assembly comprises at least two reels. The axes of the reels have a fixed angular relation to the shaft axis. That angular relation is preselected to facilitate rotation of the assembly about the shaft axis. In one embodiment the preselected angular relation of the reel axes to the shaft axis is substantially 90 degrees. The apparatus also has at least one brake engageable with a reel to restrict unwinding of the line wound thereon. When a brake is engaged with a reel, the rotatable assembly can continue to rotate freely about the shaft axis. This permits continuous rotation of the rotatable assembly in response to tension on the lines regardless of whether a brake is applied.

In accordance with another illustrative aspect of the invention there is a second brake engageable with a second reel to restrict unwinding of the line wound thereon.

In accordance with another illustrative aspect of the invention, the brake is part of the rotatable assembly that rotates about the shaft axis.

In accordance with another illustrative aspect of the invention, there is a rotatable shaft on which the reels are mounted and a first brake rod mounted such that when the brake rod is actuated, exactly one reel moves in a direction parallel to the shaft so as to engage a brake that restricts rotation of the reel. There is also a second brake rod mounted such that when that second brake rod is actuated, another reel moves in a direction parallel to the shaft so as to engage a brake that restricts rotation of that reel.

In accordance with still another illustrative aspect of the invention, the multi-reel, line-handling apparatus further includes a faceplate located proximate to the reels. The faceplate has two or more oppositely positioned holes through which the lines are passed. The faceplate responds to pull by an object fastened to one of two lines being used by rotating in a direction that tends to prevent crossing of the lines.

In accordance with yet another illustrative aspect of the invention, the rotatable shaft on which the reels are mounted has at least two elongated members located between the reels, each one of the members providing support for at least one of the reels. Each brake rod engages one of the elongated members so as to move the member, thereby causing engagement of the corresponding reel mounted on it with a brake so as to restrict rotation of that reel. The elongated members can be spring-loaded, with each spring urging each reel away from a brake. Each brake rod can overcome the spring loading for its reel.

In accordance with another illustrative aspect of the invention, the elongated members contain a plurality of cavities capable of partially containing the brake rods; the brake rods have enlarged portions, which engage some of the cavities and not other of the cavities, so as to transfer brake rod motion to those of the elongated members having cavities engaged with the brake rods but not to the elongated members lacking cavities with which the brake rods are engaged.

In accordance with another illustrative aspect of the invention, a multi-pet retractable leash apparatus comprises at least two reels on each of which is wound a leash having one end anchored to the reel on which it is wound and an opposite end adapted for being fastened to one or more pets. This illustrative aspect further contains at least two axles each of which rotatably mounts one of the reels, and means mounting the axles, the means being adapted for shifting the position of the axles, and brakes responsive to the shifting for braking a selected one of the reels.

In accordance with yet another illustrative aspect of the invention, the means adapted for shifting contains at least two spring-loaded elongated members located between the reels. Each of these elongated members provides support for an outwardly extending one of the axles. The spring loading of the members tends to maintain the axles in a position such that the means for braking is disengaged. This illustrative aspect further contains means for manually pulling on selected of the members causes engagement of the corresponding reel(s) mounted thereon with other structure(s) operative to brake the reel(s).

In accordance with another illustrative aspect of the invention, there is a faceplate located proximate to the reels and having at least two oppositely positioned holes through which the leashes are passed. The faceplate responds to tension on at least one of the leashes by rotating in a direction that tends to prevent crossing of the leashes. The faceplate can be a round disc. The faceplate can rotate in correspondence with the elongated members about the longitudinal axis thereof.

In accordance with still another illustrative aspect of the invention, the apparatus includes a housing inside which the reels, axles, means for shifting and the means responsive to shifting are mounted as a rotatable assembly that rotates about a shaft axis.

In accordance with another illustrative aspect of the invention, a multi-pet retractable leash apparatus has a faceplate located proximate to the reels and has at least two oppositely positioned holes through which each leash is passed. The faceplate is responsive to tension on the leashes by rotating in a direction that tends to prevent crossing of the leashes.

In accordance with another illustrative embodiment of the invention, a multi-pet retractable leash apparatus having means adapted for shifting the position of the axles comprising at least two spring-loaded elongated members located between the reels, wherein each of the elongated members provides support for an outwardly-extending one of the axles, and wherein the spring loading of the members tends to maintain the axles in position when the means for braking is disengaged. The apparatus also has means for manually pulling on selected members thereby causing engagement of the corresponding reel(s) mounted thereon with other structure(s) operative to brake the reel(s). Also the faceplate is a round disk mounted at one end of the elongated members and adapted to rotate in correspondence with the elongated members about their longitudinal axis.

In accordance with another illustrative embodiment of the invention, the multi-pet retractable leash apparatus includes a housing in which the reels, shafts means mounting the axles, and means responsive to the shifting for braking are mounted as a rotatable assembly which rotates about a shaft axis, wherein the rotatable assembly comprises at least two reels.

In accordance with another illustrative aspect of the invention, the means for mounting the axles and adapted for shifting the position of either of the axles comprises a main shaft split longitudinally into two split shaft members, each split shaft member having one of the axles mounted on it, and the main shaft having at least one brake rod with an enlarged end, the enlarged end located in cavities inside both split shaft members, the brake rod engaging the split shaft members differently depending on cavity differences between the split shaft members, and the brake rod having radial symmetry such that brake rod engagement of the split shaft members is independent of the angular position of the brake rod relative to the angular position of the split shaft members.

In accordance with another illustrative aspect of the invention, a multi-pet retractable leash apparatus comprises at least two reels on each of which is wound a leash having one end anchored to the reel on which it is wound and an opposite end adapted for being fastened to one or more pets. It also contains at least two axles, each of which rotatably mounts one of the reels, as well as means mounting the axles, the mounting means comprising elongated members located between the reels, each one of the elongated members providing support for an outwardly extending one of the axles, and adapted for shifting the position of either of the axles. The axles and the elongated members are mounted as an assembly, the assembly being capable of rotating around a shaft axis. The apparatus also includes means for pulling on selected of the members causing engagement of the corresponding reel mounted thereon with another structure operative to brake the reel. The means for pulling comprises at least one brake rod with an enlarged end, the enlarged end located in cavities inside the elongated members, the brake rod engaging the elongated members differently depending on cavity differences between the elongated members. Brake rod engagement of the split shaft members is independent of the angular position of the brake rod relative to the angular position of the split shaft members.

In accordance with another illustrative aspect of the invention, spring loading of the elongate members urges each reel away from the brake. The spring loading can be overcome by the at least one brake rod.

In accordance with another illustrative aspect of the invention, the axles are transverse to the shaft axis.

DETAILED DESCRIPTION

Figure 1:
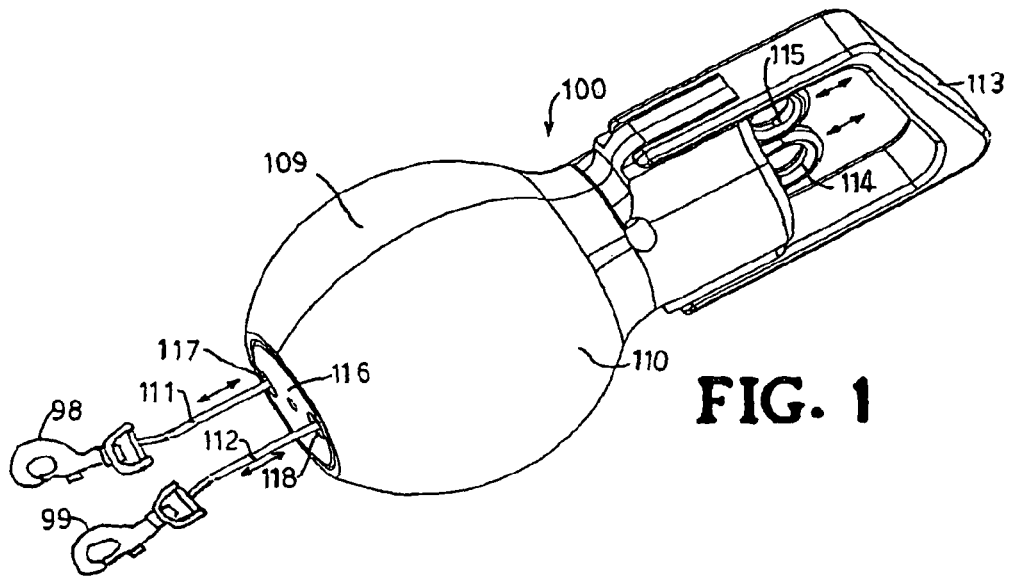
FIG. 1 is a perspective view of a line-handling apparatus according to a first illustrative embodiment of the present invention.

FIG. 1 is a perspective view of an illustrative pet leash embodiment of the invention. The pet leash can be sided and dimensioned for hand-held use. Exterior parts of leash apparatus 100 can include a molded housing having a first housing half section 109, a second housing half section 110 and a handle 113, illustrated by way of example as being attached to the proximal end of the housing, i.e., the end of the housing that in use is closest to the leash user who is walking his or her pets. The apparatus can further include an inner brake rod trigger 114 and an outer brake rod trigger 115, each of which protrudes from the proximal end of the housing into the area encompassed by handle 113. These triggers operate the leash reel brakes, as described below. A faceplate 116 is at the distal end of the housing, i.e., the end of the housing that in use is closest to the pets that are being walked by the leash user. Faceplate 116 contains a first leash passage 117 and a second leash passage 118, through which pass first leash 111 and second leash 112. These leashes can be made of any material useful for leashing pets and that can be wound around leash reels; they are preferably, but need not be, string-like in configuration. At the distal end of first leash 111 is schematically illustrated first fastener 98 for attaching one or more pets to the end of first leash 111. At the distal end of second leash 112 is schematically illustrated second fastener 99 for attaching one or more pets to the end of second leash 112.

Figure 2:
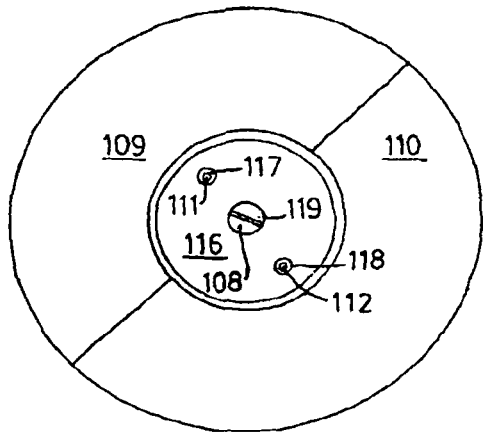
FIG. 2 is a front view of an illustrative faceplate of the line-handling apparatus of FIG. 1.
Figure 6:
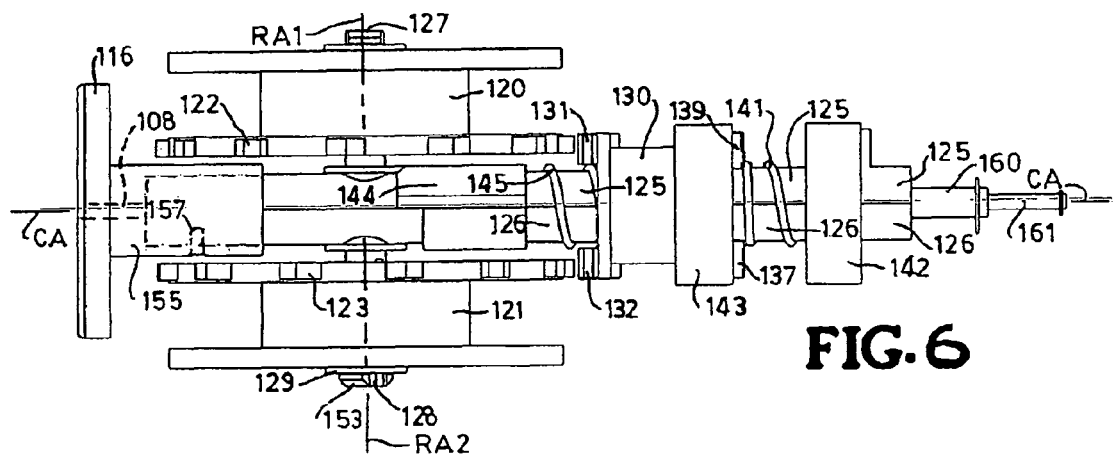
FIG. 6 is a plan view of the line-handling apparatus of FIG. 1, shown for clarity without the housing and without the pull mechanism for operating the leash braking devices, and shown with the reel axles in an illustrative aligned position.
Figure 4:
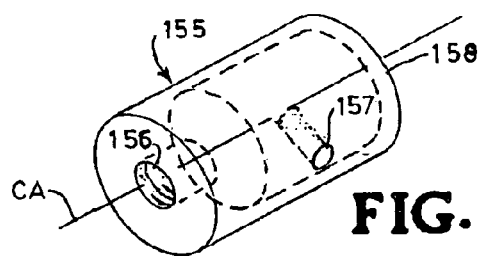
FIG. 4 is an enlarged perspective view of an illustrative mounting tube of the line-handling apparatus of FIG. 1.

FIG. 2 shows the distal end of the apparatus, with faceplate 116 surrounded by first housing half section 109 and second housing half section 110. First leash passage 117 and second leash passage 118 are also shown. First leash 111 and second leash 112 are shown passing through first leash passage 117 and second leash passage 118, respectively. The leash passages are laterally separated and located opposite each other on the face, of faceplate 116. A fastener such as machine screw 108 passes through fastener opening 119 in the center of faceplate 116 to fasten the faceplate 116 to a threaded opening 156 formed in mounting tube 155 as shown in FIG. 4. A hollow end of tube 155 snugly and slidably receives the distal ends of first and second split shaft members 125, 126 as illustrated in FIG. 6. A pin 157 passes through an outer wall of tube 155 and into second split shaft member 126.

Figure 3:
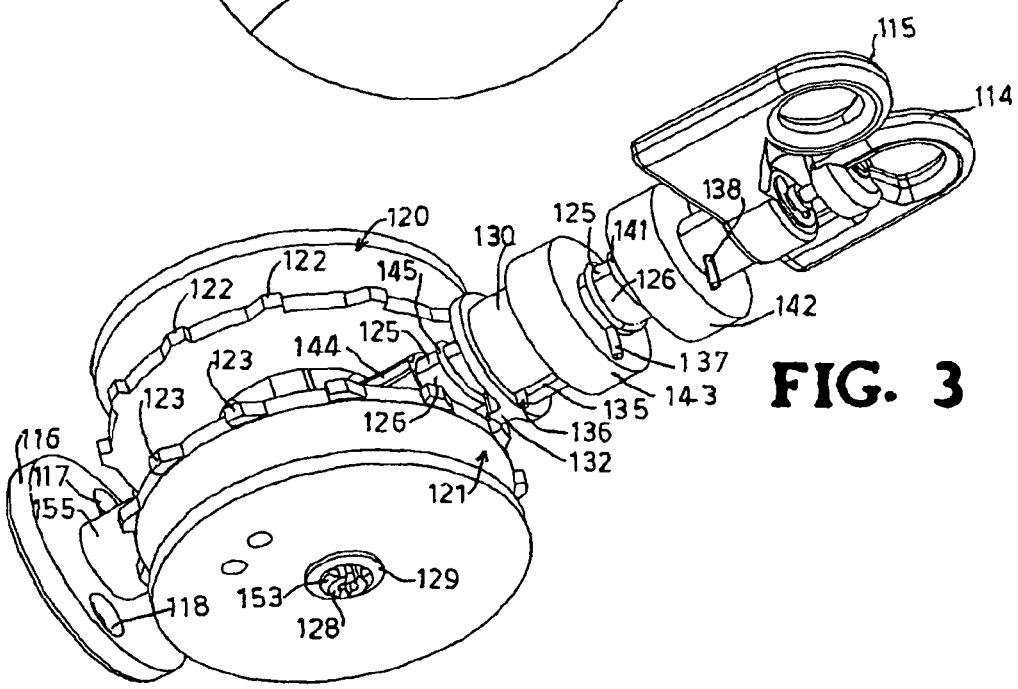
FIG. 3 is a perspective view of the line-handling apparatus of FIG. 1, shown for clarity without the housing and leashes.

FIG. 3 shows the interior of the apparatus with the housing and leashes removed. The interior parts can be grouped into non-rotating parts and parts that constitute the rotatable sub-assembly. The non-rotating parts can include inner brake rod trigger 114 and outer brake rod trigger 115, inner brake rod 161, and outer brake rod 160 (FIGS. 6 and 8), along with the outer races of proximal bearing ring 142 and distal bearing ring 143.

The rotatable sub-assembly rotates about an axis referred to for convenience as a shaft axis CA (FIG. 6) that runs the length of the device. The rotatable sub-assembly unit can comprise a shaft configuration made up of a shaft split longitudinally into a first split shaft member 125 and a second split shaft member 126, both split shaft members being slidably mounted on each other and in the inner races of proximal bearing ring 142 and distal bearing ring 143. Mounted on first split shaft member 125 is first reel axle 127 (FIG. 6), on which is rotatably mounted first reel assembly 120. Mounted on second split shaft member 126 is second reel axle 128 (FIG. 6) on which is rotatably mounted second reel assembly 121. FIG. 3 shows second reel assembly 121 mounting rotatably on second reel axle 128 using ring bearing 129. Ring bearing retaining lip 153 (FIG. 5) holds the ring bearing on the axle. First reel assembly 120 mounts rotatably on first reel axle 127 (FIG. 6) using a ring bearing in the same manner. The reel assemblies can be mounted side-by-side. The rotatable sub-assembly can further include a round faceplate 116 affixed to mounting tube 155 (FIG. 6), which in turn is pinned to second split shaft member 126 as previously described. Thus, when second split shaft member 126 moves axially along the shaft axis CA (FIG. 6), mounting tube 155 and faceplate 116 move axially with it.

The entire rotatable sub-assembly rotates as a unit about the shaft axis CA inside a stationary housing made up of two housing half sections 109 and 110 (FIG. 1). As will be appreciated, first leash 111 and second leash 112 extend through first leash passage 117 and second leash passage 118, respectively, and are wound on respective reel assemblies 120 and 121. Each reel assembly can have an independent rewind spring (not shown) that serves to rewind its respective leash when the leash is sufficiently slack.

The face of first reel assembly 120 closest to first split shaft member 125 has a set of first brake teeth 122 around its circumference. The face of second reel assembly 121 closest to second split shaft member 126 has a similar set of second brake teeth 123 around its circumference. When braking of the second reel assembly 121 is called for, second reel assembly 121 moves in an proximal direction so as to bring second brake teeth 123 closer to second brake catch 132 mounted on brake collar 130. When second brake teeth 123 actually contact second brake catch 132, the brake teeth engage the brake catch, thus causing the reel to stop turning. First reel assembly 120, first brake teeth 122, and first brake catch 131 (FIG. 6) operate in a similar manner.

Two brake collar slots (one slot, 135, is shown in FIG. 3) are located on opposing sides of brake collar 130. First split shaft member 125 and second split shaft member 126 have pins (one of which, first pin 136, is shown in FIG. 3 on split shaft member 126) each of which protrudes through one of the brake collar slots (one of the two slots, brake collar slot 135, is shown). The distal end of distal shaft return spring 145 presses against the spring extender 144, which in turn presses against the inner portion of a reel axle. The proximal end of distal shaft return spring 145 presses against brake collar 130, thereby urging brake collar 130 against the inner race of distal bearing ring 143. Since the housing holds distal bearing ring 143 stationary, distal shaft return spring 145 can keep brake collar 130 stationary by urging it against the inner race of the bearing, while at the same time allowing the split shaft members which pass through brake collar 130 to slide freely along the shaft axis within the collar. Each split shaft member mounts a pin against which proximal shaft return spring 141 presses. First shaft member 125 mounts third pin 139 (FIG. 6); second split shaft member 126 mounts second pin 137. In use, proximal shaft return spring 141 presses against these two pins, thereby urging the pins and the shafts to which they are attached distally along shaft axis CA so as to urge the brake teeth away from the brake catches. The inner race of distal bearing ring 143 stops proximal shaft return spring 141 from pushing the split shaft members too far distally. A fourth pin 138 (FIG. 3) affixed to second split shaft member 126 serves to help maintain the position of proximal bearing ring 142. Split shaft members 125 and 126 slide freely along the shaft axis CA within the inner race of proximal bearing ring 142 and the inner race of distal bearing ring 143. The outer race of each bearing ring mounts within the housing as shown. This arrangement permits the rotatable sub-assembly to rotate while also allowing the split shaft members to slide independently within a limited range of axial travel.

Referring to FIG. 4, mounting tube 155 as previously mentioned is shown with threaded mounting tube opening 156. First split shaft member 125 and second split shaft member 126 are inserted (FIGS. 4 and 6) into an opening in the hollow end of mounting tube 155 opposite the threaded mounting tube opening 156. The mounting tube thus captures the distal ends of split shaft members 125 and 126 and keeps the members from separating. Mounting tube 155, into which members 125 and 126 are received, fastens to second split shaft member 126 using a mounting tube pin 157 (FIG. 6) inserted through a mating mounting tube shaft pin opening and into second split shaft member 126. Mounting tube 155 is not fastened to first split shaft member 125.

Figure 5:
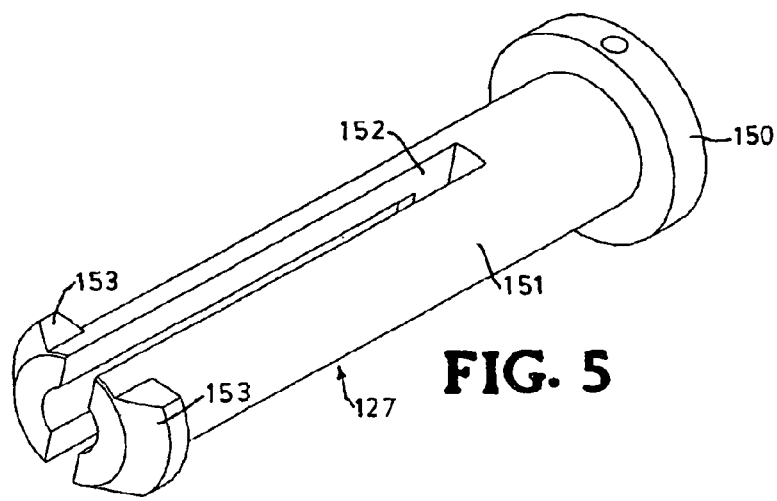
FIG. 5 is an enlarged perspective view of an illustrative reel axle of the line-handling apparatus of FIG. 1.

FIG. 5 is a single drawing representing the construction used in both first reel axle 127 and identical second reel axle 128. Each reel axle has a reel axle head 150. The head of first reel axle 127 engages first hole lip 163 in first hole 162 shown somewhat schematically in FIG. 7. The head of second reel axle 128 engages second hole lip 183 in second hole 180 shown somewhat schematically in FIG. 9, described below. Reel axle shaft 151 extends the width of its reel apparatus. Reel axle split 152 enables the axle to be compressed at its outside end, the end opposite reel axle head 150, so that ring bearing 129 can be slipped over ring bearing retaining lip 153. After assembly, a wedge (not shown), keeps reel axle split 152 open at its outside end near the bearing ring. The wedge is inserted into reel axle split 152 from the outside end to prevent the split from collapsing and releasing the bearing ring.

Figure 8:
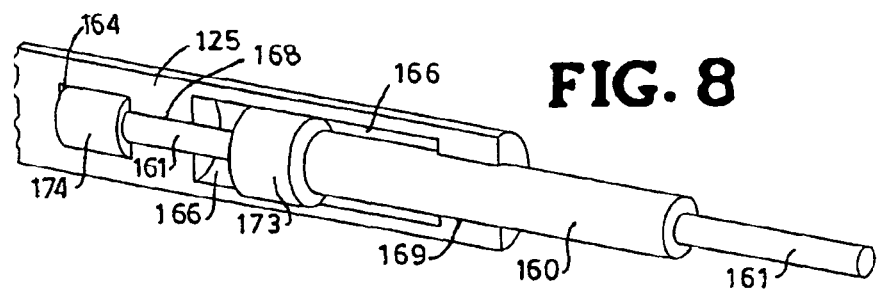
FIG. 8 is a perspective partial view of the first split shaft member of FIG. 7, shown for clarity with illustrative inner and outer brake rods installed.
Figure 10:
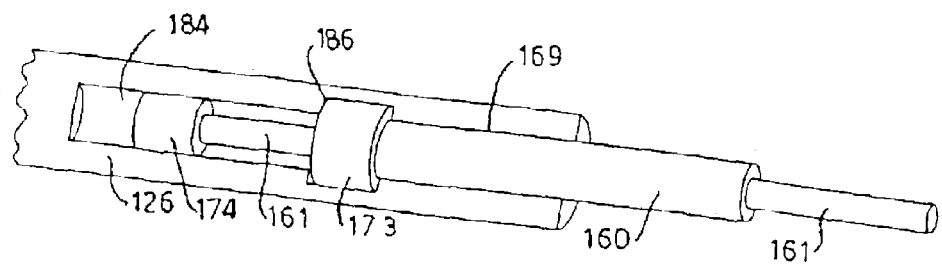
FIG. 10 is a perspective partial view of the second split shaft member of FIG. 9, shown with the inner and outer brake rods of FIG. 8 installed.
Figure 11:
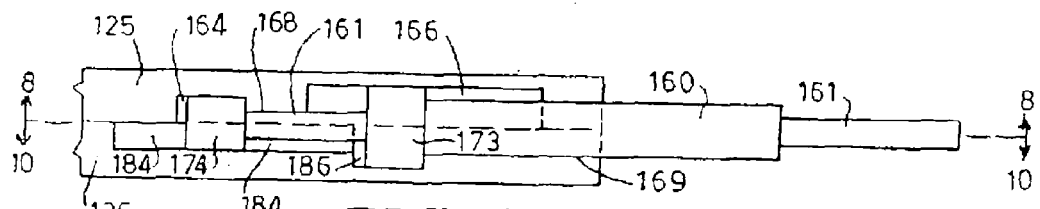
FIG. 11 is a sectional view of the first and second split shaft members assembled together with the inner and outer brake rods.

FIG. 6 is a plan view of the apparatus normally enclosed but shown without its housing. The view shows faceplate 116, first split shaft member 125 and second split shaft member 126, first reel assembly 120 and second reel assembly 121, first reel axle 127 and second reel axle 128. The split shaft members are spring-loaded elongated members that constitute a rotatable shaft on which the reels are mounted using axles. In FIG. 6 the reel axles are shown aligned. FIG. 6 also shows proximal bearing ring 142 and distal bearing ring 143, distal shaft return spring 145 and proximal shaft return spring 141. FIG. 6 also provides a view of distal shaft return spring 145 pressing spring extender 144 distally against part of first reel axle 127, thereby forcing first brake teeth 122 distally away from first brake catch 131. Proximal shaft return spring 141 is shown pressing against proximal bearing ring 142 as well as second pin 137 and third pin 139, thereby urging the pins and the split shaft members on which they are mounted (and consequently their reel assemblies with their brake teeth) distally away from the brake catches. Outer brake rod 160 and inner brake rod 161 are also shown. The proximal portion of inner brake rod 161 is shown entering an opening in the proximal end of outer brake rod 160. FIGS. 8, 10 and 11 show the distal end of inner brake rod 161 emerging from the distal end of outer brake rod 160 in order to engage first split shaft member 125. The proximal portion of outer brake rod 160 is shown entering an opening in the proximal end of the pair of split shaft members 125 and 126. Once inside the split shaft members, the distal end of outer brake rod 160 engages second split shaft 126 (FIGS. 8, 10 and 11). FIG. 6 also shows faceplate 116, mounting tube 155, mounting tube shaft pin opening 157, first and second brake teeth 122 and 123, ring bearing 129, ring bearing retaining lip 153, brake collar 130 and second brake catch 132. FIG. 6 also shows the rotatable sub-assembly, whose main components can include split shaft members 125 and 126 extending along the shaft axis CA, faceplate 116 and reel assemblies 120 and 121.

Figure 7:
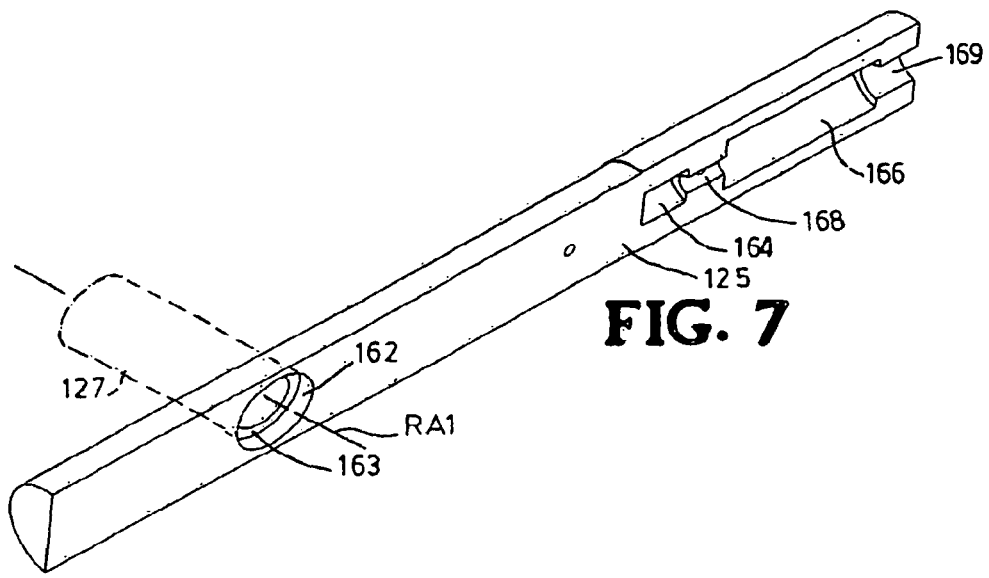
FIG. 7 is an enlarged perspective view of an illustrative first split shaft member of the line-handling apparatus of FIG. 1.

FIG. 7 is a perspective view of first split shaft member 125. First split shaft member 125 supports first reel assembly 120 by receiving and mounting the inner end of first reel axle 127 in first hole 162. Surrounding the outer edge of first hole 162 is first hole lip 163. The first hole lip has an inside diameter that is larger than the diameter of reel axle shaft 151, thereby permitting the shaft to pass through the opening formed by the lip, but smaller than the outside diameter of reel axle head 150. Thus, when reel axle shaft 151 of first reel axle 127 is inserted into first hole 162, reel axle shaft 151 passes through the hole, but the head is caught and held in place by the lip. The figure shows outer brake rod guide 169, which limits the path of travel of the outer brake rod (not shown in this view) to axial and rotational movements as the outer brake rod enters outer brake rod head cavity 166. Inner brake rod 161 (not shown in this view) after passing through the outer brake rod 160 (not shown) passes through inner brake rod guide 168 and into inner brake rod head socket 164.

FIG. 8 is a partial view of first split shaft member 125 with the brake rods in place. Inner brake rod 161 passes into the proximal end of hollow outer brake rod 160, out the distal end, through inner brake rod guide 168, and finally into inner brake rod head socket 164, where inner brake rod head 174 engages inner brake rod head socket 164. This engagement results in axial movement by inner brake rod 161 along shaft axis CA being transferred through inner brake rod head 174 and inner brake rod head socket 164 to first split shaft member 125. Outer brake rod 160 with its outer brake rod head 173 is shown passing through outer brake rod guide 169 and into outer brake rod head cavity 166 in first split shaft member 125, wherein outer brake rod head 173 is free to move without affecting the axial position of first split shaft member 125. Axial movement of inner brake rod 161 thus moves first split shaft member 125 but axial movement of outer brake rod 160 does not move first split shaft member 125.

Figure 9:
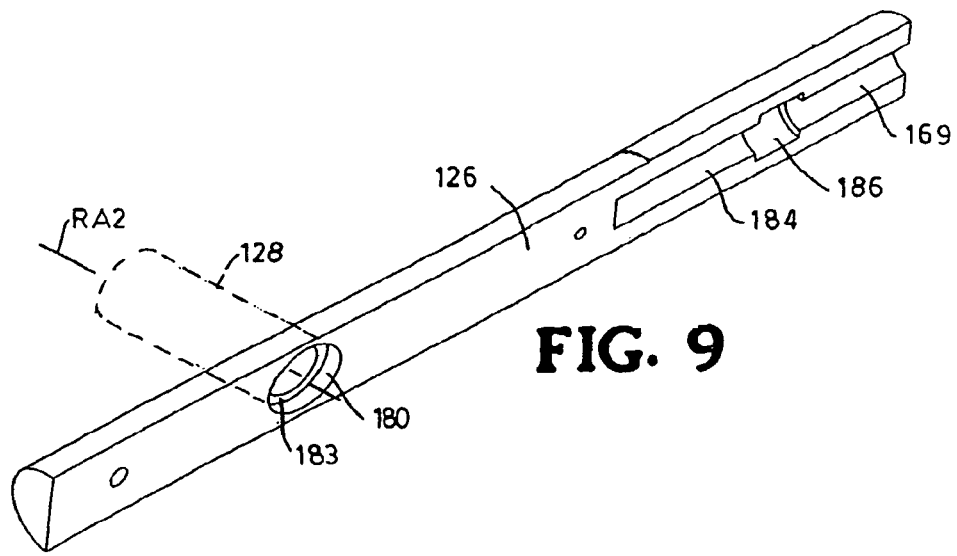
FIG. 9 is an enlarged perspective view of an illustrative second split shaft member of the line-handling apparatus of FIG. 1.

FIG. 9 is a perspective view of second split shaft member 126. The second split shaft member supports second reel assembly 121. Second hole 180 with second hole lip 183 in second split shaft member 126 receives and mounts an inner end of second reel axle 128 in the same manner that first hole 162 with first hole lip 163 in first split shaft member 125 receives and mounts an inner end of first reel axle 127. Outer brake rod guide 169 confines the travel of outer brake rod 160 (not shown in this view) to axial and rotational movements as outer brake rod 160 moves within second split shaft member 126.

FIG. 10 shows second split shaft member 126 with the brake rods in place. Outer brake rod 160 is shown passing through outer brake rod guide 169 and engaging outer brake rod head socket 186. This engagement results in axial movement by outer brake rod 160 along shaft axis CA being transferred through outer brake rod head 173 and outer brake rod head socket 186 to second split shaft member 126. Inner brake rod 161 with its inner brake rod head 174 is shown passing into the proximal end of hollow outer brake rod 160, out the distal end and into the inner brake rod bead cavity 184 in the second split shaft member 126, where inner brake rod head 174 is free to move without transferring axial movement to second split shaft member 126. Axial movement of outer brake rod 160 thus moves second split shaft member 126 but axial movement of inner brake rod 161 does not moves second split shaft member 126.

FIG. 11 is a sectional view of assembled parts of both split shaft members showing both split shaft members 125 and 126 (FIGS. 8 and 10) and both brake rods 160 and 161 assembled.

In operation, a leash user holds handle 113 and attaches one or more pets to first fastener 98 and one or more pets to second fastener 99. One, two, or more pets could thus be attached to the first leash and one, two, or more pets could be attached to the second leash. As the pets move away from the leash user, first leash 111 and the second leash 112 are payed out from first reel assembly 120 and second reel assembly 121, respectively. The freely rotatable sub-assembly—which can be comprise faceplate 116, mounting tube 155, the two reel assemblies 120 and 121, their axles 127 and 128 and the two split shaft members 125 and 126—rotates around shaft axis CA of split shaft members 125 and 126 in response to pull by a pet fastened to one of the leashes, the rotation being in a direction that tends to prevent crossing of the leashes. This automatic rotation results because when a pet originally on the same side of the shaft axis as its leash passage moves to the opposite side of the shaft axis, the resulting imbalance creates a torque on the rotatable sub-assembly that causes the sub-assembly to rotate until the leash passage is on the same side of the shaft axis as the pet. This tendency of sub-assembly rotation to follow movements of the pets prevents leash line crossing and tangling.

Each of the pets can be restrained independently by actuating the appropriate brake rod trigger. Actuating inner brake rod trigger 114 locks first reel assembly 120, thus restraining the pet(s) on first leash 111. Actuating outer brake rod trigger 115 locks second reel assembly 121, thus restraining the pet(s) on second leash 112. Locking one reel assembly has no effect on the other reel assembly and no effect on the rotation of the sub-assembly. Thus either of the pets, all the pets, or neither pet, can be restrained while at the same time maintaining free rotation of the rotatable sub-assembly to permit automatic uncrossing of the leashes.

The mechanism connecting the brake rod triggers and reel brakes is similar for both reels. Pulling one brake rod trigger pulls one brake rod, which in turn pulls one split shaft member. Movement of the split shaft member moves the reel mounted on it to engage the brake teeth on that reel with a brake catch, thereby locking the reel. Specifically, pulling inner brake rod trigger 114 proximally toward the leash user causes inner brake rod 161, to which inner brake rod trigger 114 is connected, to move proximally as well. Since inner brake rod head 174 mounted on inner brake rod 161 is closely coupled to first split shaft member 125 by virtue of the head's close fit into inner brake rod head socket 164 in first split shaft member 125, first split shaft member 125 also moves proximally. Note that second split shaft member 126 does not move, because inner brake rod head 174 is in a cavity in second split shaft member 126 rather than in a socket. While the head is axially constrained inside the socket of first split shaft member 125, the head moves freely in an axial direction inside the larger cavity of second split shaft member 126 without affecting the position of second split shaft member 126. The two split shaft members thus slide past each other as one or the other trigger is pulled. Since first reel assembly 120 is mounted on first split shaft member 125, when that split shaft member moves proximally so does first reel assembly 120. That movement proximally causes first brake teeth 122 to engage first brake catch 131, thereby braking the first reel assembly.

When first split shaft member 125 is moved proximally, fourth pin 139 mounted on first split shaft member 125 presses against proximal shaft return spring 141 and compresses the spring. When the trigger is released, the compressed spring presses against the pin and urges the split shaft member distally, thereby moving the reel distally and causing the brake teeth to become disengaged from the brake catch.

Outer brake rod trigger 115 operates using a similar mechanism. Outer brake rod trigger 115 is connected to outer brake rod 160. Referring to FIG. 11, when outer brake rod 160 is actuated, outer brake rod head 173 moves axially along shaft axis CA. Since outer brake rod head 173 is enclosed in outer brake rod head socket 186 of second split shaft member 126, second split shaft member 126 is forced to follow the axial movements of outer brake rod head 173. In contrast, FIG. 11 shows that the same outer brake rod head 173 inside larger outer brake rod head cavity 166 of first split shaft member 125 can move freely in an axial direction without influencing first split shaft member 125. This is because outer brake rod head cavity 166 is long enough to permit outer brake rod head 173 to move freely inside first split shaft member 125 without causing first split shaft member 125 to move.

Braking while still permitting the reel assembly to rotate freely, thereby preventing leash tangling, can be accomplished by coupling the rotatable sub-assembly to the two non-rotating braking controls in such a way that operating a trigger causes a split shaft member to move along the shaft axis while at the same time not interfering with rotation of the rotatable sub-assembly. Each of the brake rod heads couples with one appropriate brake rod head socket axially, but there is no coupling rotationally. The brake rods can move in and out without affecting the assembly's ability to rotate. This method for coupling the rotatable sub-assembly to the non-rotating braking controls for independently braking each reel is believed to be unique.

According to an illustrative embodiment, a design consideration is the fit between proximal shaft return spring 141 and split shaft members 125 and 126. The inside diameter of proximal shaft return spring 141 can be large enough so that when one of the shafts is retracted to brake the corresponding reel, there is enough space between proximal shaft return spring 141 and the un-retracted one of split shaft members 125 and 126 to permit continued pressure by proximal shaft return spring 141 against the pin (137 or 139) on the un-retracted split shaft member, thereby permitting braking one reel without affecting the freedom of the other reel.

Figure 12:
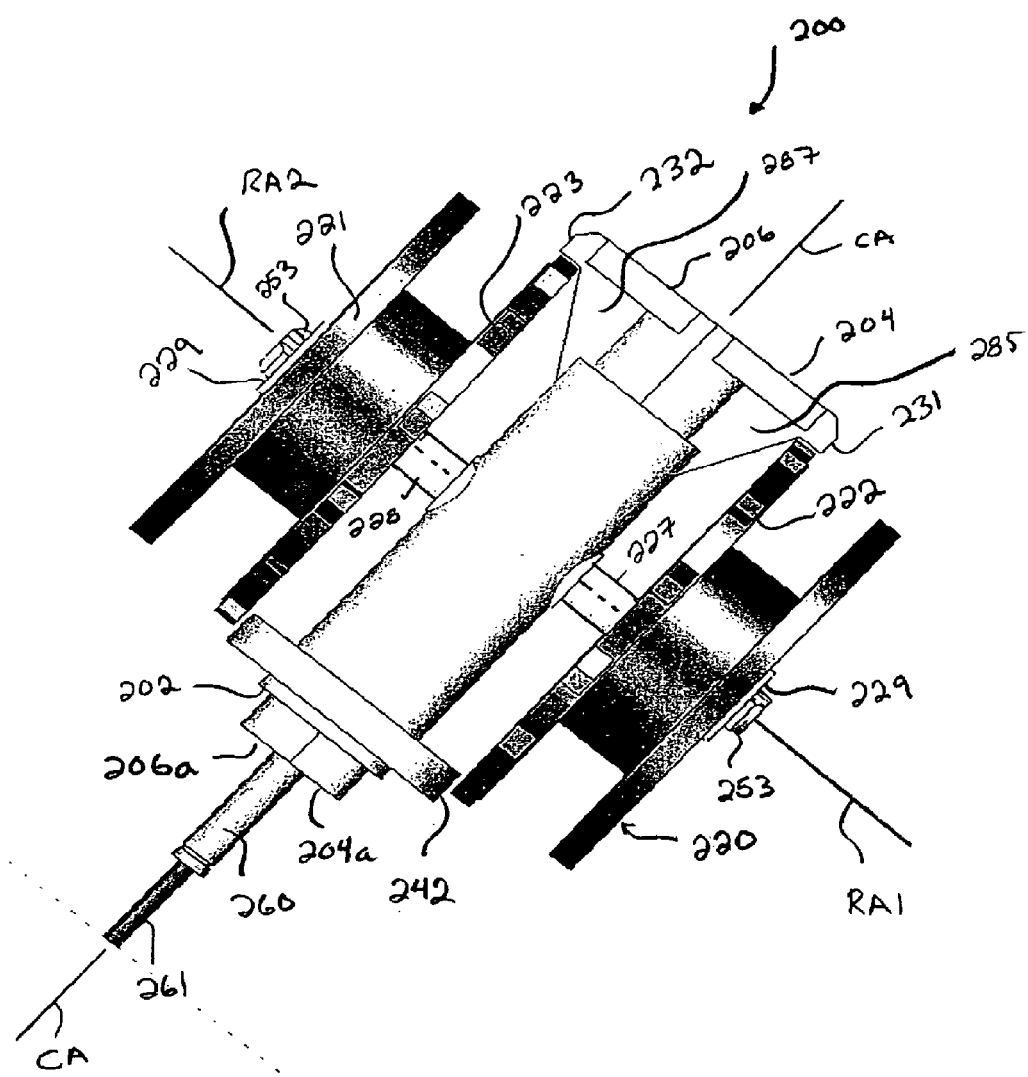
FIG. 12 is a perspective view of a line-handling apparatus according to a second illustrative embodiment of the present invention, the line-handling apparatus shown for clarity without the housing, leashes, and brake rod triggers.
Figure 13:
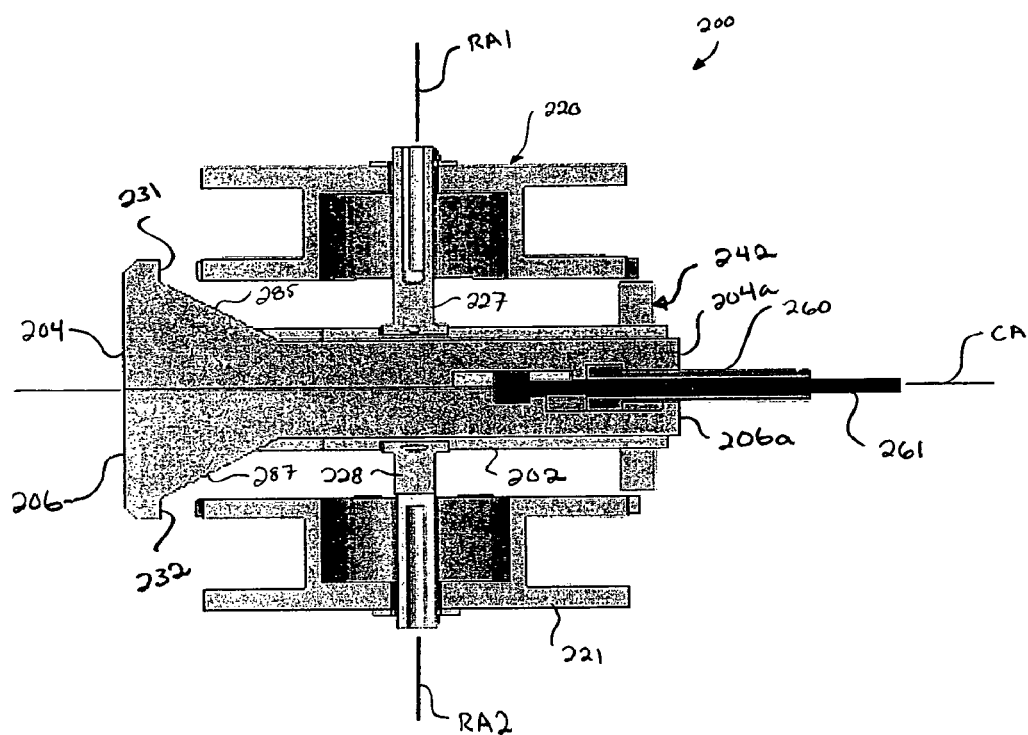
FIG. 13 is a top, cross-sectional view of the line-handling apparatus shown in FIG. 12.

Referring to FIGS. 12 and 13, a second illustrative embodiment of a leash apparatus 200 according to the present invention is shown. To facilitate explanation of the structure and function of the leash apparatus 200, it is shown without a housing, leashes, and brake rod triggers. According to an illustrative embodiment, the leash apparatus 200 can have a housing, leashes, and brake rod triggers similar in design to those shown and described in connection with the leash apparatus 100, shown, for example, in FIGS. 1-3.

The leash apparatus 200 can include a rotatable subassembly generally including a support shaft 202, a first sliding brake member 204, a second sliding brake member 206, a first reel assembly 220, and a second reel assembly 221. The subassembly can rotate within the housing (not shown) about a shaft axis CA, shown in FIGS. 12 and 13. According to an illustrative embodiment, a bearing ring 242 can facilitate rotation between the subassembly and the housing. For example, the bearing ring 242 can include an inner race mounted to the support shaft 202, and an outer race mounted to the housing, thereby providing rotation between the support shaft 202 (and the components mounted thereto), and the housing. One of ordinary skill in the art will appreciate, however, that other structures can be utilized to rotatably mount the subassembly and/or support shaft 202 within the housing.

According to the illustrative embodiment shown in FIGS. 12 and 13, the first reel assembly 220 can be mounted to the support shaft 202 by a first reel axle 227 extending from the support shaft 202, and the second reel assembly 221 can be mounted to the support shaft by a second reel axle 228 extending from the support shaft 202. The first reel axle 227 can define a first reel axis RA1 about which the first reel assembly 220 rotates, and the second reel axle 228 can define a second reel axis RA2 about which the second reel assembly rotates. As shown in FIGS. 12 and 13, the first and second reel axes RA1, RA2 can be aligned, or alternatively, the first and second reel axes RA1, RA2 can be angled with respect to one another. The first and second reel axes RA1, RA2 can be angled with respect to the shaft axis CA, for example, they can be substantially transverse thereto, as shown in FIGS. 12 and 13. According to an alternative embodiment, described below, the first reel axle 227 and the second reel axle 228 can be substituted with a single reel axle mounting both the first and second reel assemblies 220, 221.

Referring to FIG. 12, the first reel assembly 220 can rotatably mount on the first reel axle 227 using a ring bearing 229. A ring bearing retaining lip 253 can hold the ring bearing 229, and first reel assembly 220, on the axle 227. The second reel assembly 221 can mount rotatably on second reel axle 228 in a similar manner. One of ordinary skill in the art will appreciate, however, that other structures can be utilized to rotatably mount the first and second reel assemblies 220, 221 to the respective reel axles 227, 228. Each reel assembly 220, 221 can include an independent rewind spring (not shown) that serves to rewind its respective leash (not shown) onto the reel assembly when the leash is sufficiently slack.

According to another illustrative aspect of the invention, the leash apparatus 200 can include a user-operable brake mechanism that operates independently on each reel assembly 220, 221. For example, a first sliding brake member 204 and a second sliding brake member 206 can be mounted to the support shaft 202 such that the first and second sliding brake members 204, 206 can slide along the support shaft 202 independently of one another. In the illustrative embodiment shown, each sliding brake member 204, 206 can have a shaft portion 204*a*, 206*a* with a semi-circular cross section, and the support shaft 202 can have a hollow interior that receives the shaft portions 204*a*, 206*a*. A first flange 285 can be located on the first sliding brake member 204, and can mate with a corresponding first slot (not shown) in the support shaft 202 to prevent the first sliding brake member 204 from rotating within the support shaft 202. Similarly, a second flange 287 can be located on the second sliding brake member 206 to mate with a corresponding second slot (not shown) in the support shaft 202 to prevent the second sliding brake member 206 from rotating within the support shaft 202. One of ordinary skill in the art will appreciate, however, that other shapes and configurations of the brake members 204, 206 and the support shaft 202 are possible.

Still referring to FIGS. 12 and 13, each sliding brake member 204, 206 can include a brake catch 231, 232, respectively. The corresponding reel assemblies 220, 221 can each include a plurality of brake teeth 222, 223 (shown in FIG. 12), which are adapted to engage the respective brake catches 231, 232 to prevent rotation of the respective reel assemblies 220, 221. In the illustrative embodiment shown, the shaft portions 204*a*, 206*a* can slide within the hollow interior of the support shaft 202 (e.g., along the shaft axis CA), thereby moving the brake catches 231, 232 toward and away from the corresponding brake teeth 222, 223. One or more return springs (not shown) can be provided to bias the sliding brake members 204, 206 away from the corresponding reel assemblies 220, 221, thereby allowing the reel assemblies 220, 221 to rotate freely, unless the user actuates one or both of the brake members 204, 206.

According to an illustrative embodiment, when the first brake catch 231 engages one or more of the first brake teeth 222 on the first reel assembly 220, the first reel assembly 220 is substantially prevented from rotation about the first reel axis RA1, but the second reel assembly 221 is still free to rotate about the second reel axis RA2. Similarly, when the second brake catch 232 engages one or more of the second brake teeth 223 on the second reel assembly 221, the second reel assembly 221 is substantially prevented from rotation about the second reel axis RA2, but the first reel assembly 220 is still free to rotate about the first reel axis RA1. When the first brake catch 231 and the second brake catch 232 simultaneously engage one or more of the respective brake teeth 222, 223, both the first reel assembly 220 and the second reel assembly 221 are substantially prevented from rotation about the first reel axis RA1 and the second reel axis RA1, respectively. According to an illustrative embodiment, the support shaft 202 can rotate within the housing about the shaft axis CA regardless of whether the first brake catch 231 or the second brake catch 232 is engaged with the respective first brake teeth 222 or second brake teeth 223.

Referring to FIG. 13, the first sliding brake member 204, second sliding brake member 206, and support shaft 202, among other components, are shown in cross-section to illustrate the structure of the outer brake rod 260 and the inner brake rod 261. According to the illustrative embodiment shown, the inner brake rod 261 can extend concentrically through the outer brake rod 260, however, other configurations are possible. The inner brake rod 261 can connect to an inner brake rod trigger (not shown), which can be similar to the inner brake rod trigger 114 shown in FIGS. 1 and 3, and described in connection therewith. The outer brake rod 260 can connect to an outer brake rod trigger (not shown), which can be similar to the outer brake rod trigger 115 shown in FIGS. 1 and 3, and described in connection therewith. The inner brake rod trigger can be actuated by a user to move the second sliding brake member 206 via the inner brake rod 261, without moving the first sliding brake member 204. Similarly, the outer brake rod trigger can be actuated by a user to move the first sliding brake member 204 via the outer brake rod 260, without moving the second sliding brake member 206. Reference is made to FIGS. 7-11, and the accompanying description, for further illustrative details regarding the operation of the outer and inner brake rods 260, 261 to engage the first and second sliding brake members 204, 206 with the first and second reel assemblies 320, 321, respectively.

Referring to FIGS. 14-21, a third illustrative embodiment of a leash apparatus 300 according to the present invention is shown. To facilitate explanation of the structure and function of the leash apparatus 300, it is shown without leashes. According to an illustrative embodiment, the leash apparatus 300 can have leashes similar in design to those shown and described in connection with the leash apparatus 100, shown, for example, in FIG. 1.

Figure 14:
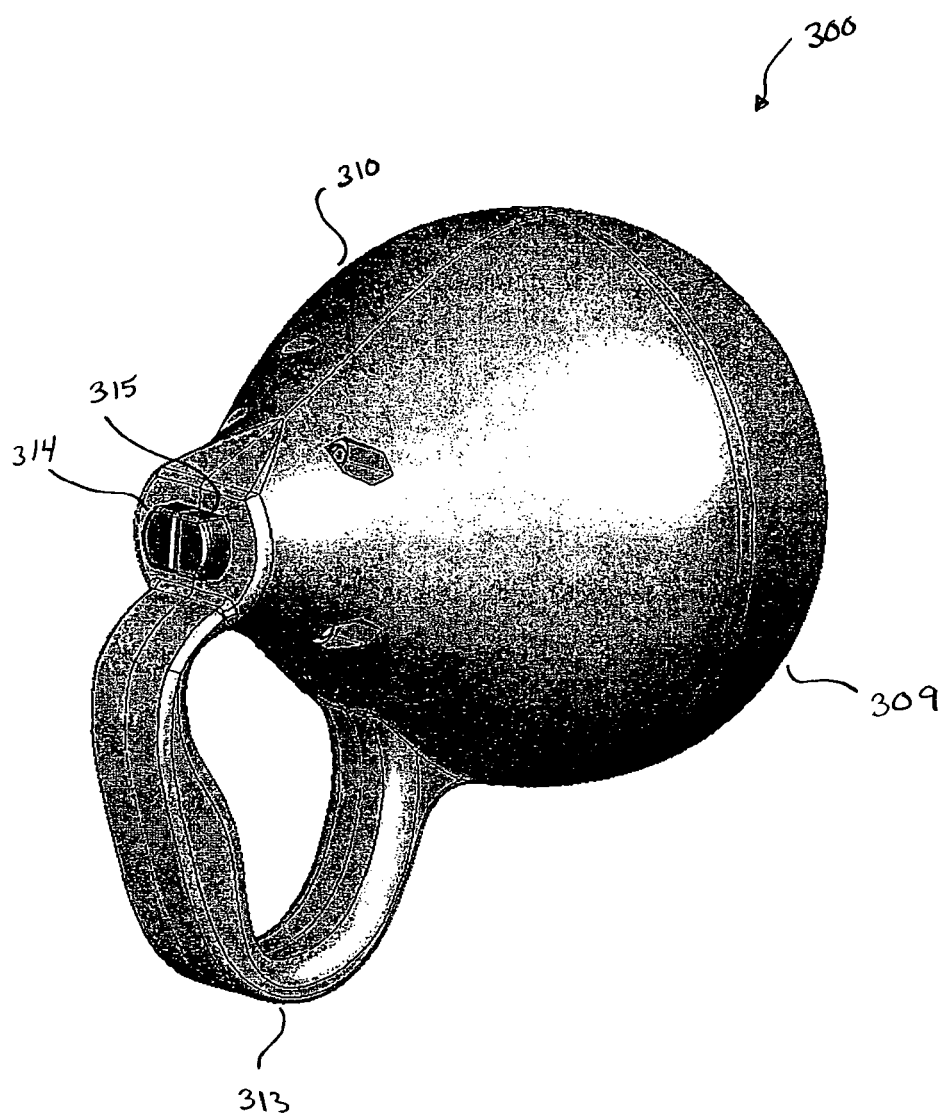
FIG. 14 is a rear, perspective view of a line-handling apparatus according to a third illustrative embodiment of the present invention.
Figure 15:
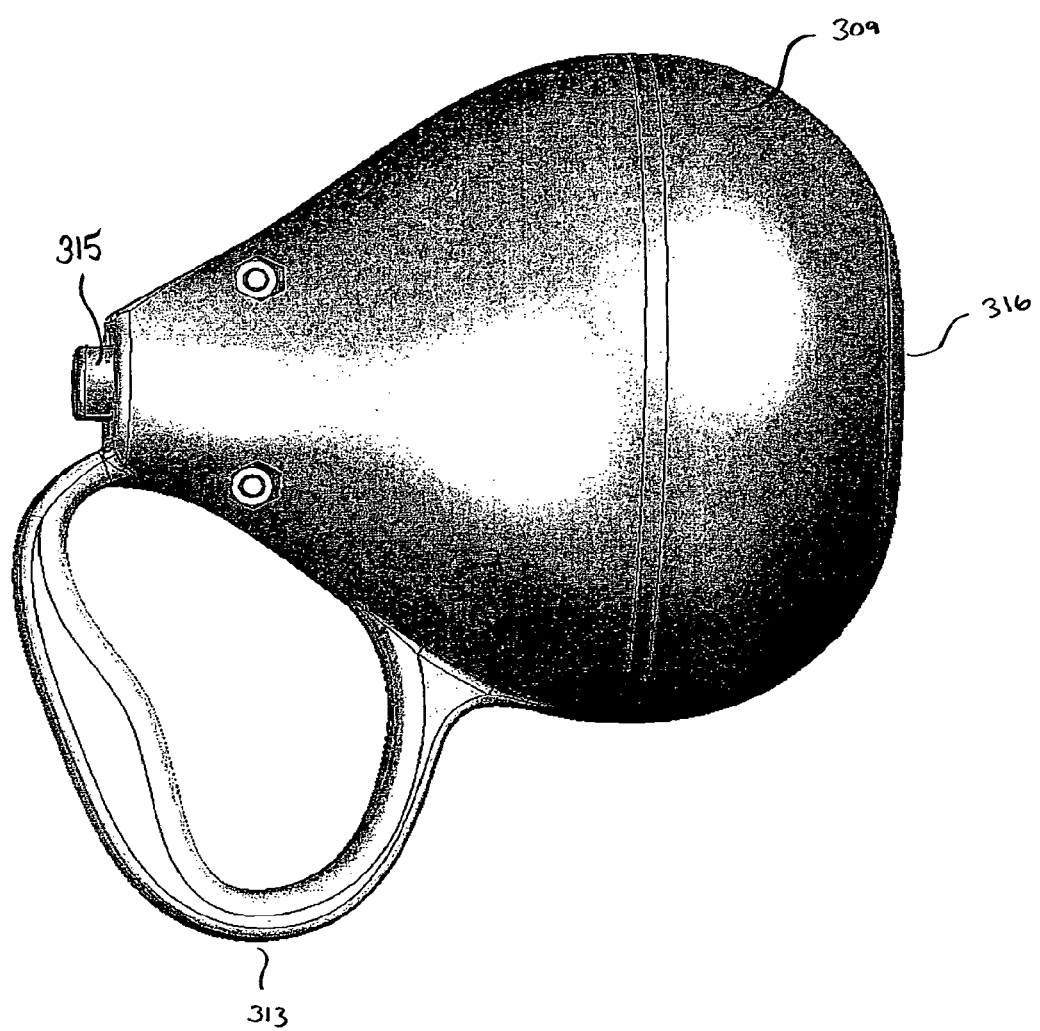
FIG. 15 is a side view of the line-handling apparatus of FIG. 14.

FIG. 14 is a rear, perspective view of the leash apparatus 300, and FIG. 15 is a side view of the leash apparatus 300. Leash apparatus 300 can include a molded housing having a first housing half section 309, a second housing half section 310, and a handle 313, illustrated by way of example as being attached to the proximal end of the housing, i.e., the end of the housing that in use is closest to the leash user who is walking his or her pets. The handle 313 can be integral with the housing half section 309 or 310, or alternatively, can be a separate item fastened thereto. According to an alternative embodiment (not shown), an anchor can be provided in place of, or in addition to, the handle 313. The anchor can serve to secure the leash apparatus 300 to a stationary object, such as a tree, fence post, or park bench. The anchor can comprise, for example, a hook, karabiner, loop of rope or webbing, or other object that can attach to a stationary object. The anchor may be useful, for example, in instances where the user wishes to tie his or her pets to a stationary object via the leash apparatus 300. According to an illustrative embodiment, such a "tie up" version of the apparatus may be provided without reel brakes, however, the present invention is not limited to such an embodiment.

Still referring to FIGS. 14 and 15, the leash apparatus 300 can further include actuation members in the form of an inner brake rod button 314 and an outer brake rod button 315, which can protrude from the proximal end of the housing near the handle 313. These buttons can operate the leash reel brakes, as described below. In contrast to the embodiments shown in FIGS. 1-13, where the actuation members for the brakes comprise "triggers" that a user pulls with their finger or thumb, in FIGS. 14 and 15, the inner brake rod button 314 and outer brake rod button 315 can comprise "push buttons" that a user depresses with their finger or thumb. One of ordinary skill in the art will appreciate, however, the leash apparatus 300 of FIGS. 14-21 can alternatively have triggers instead of the inner and outer brake rod buttons 314, 315.

Figure 16:
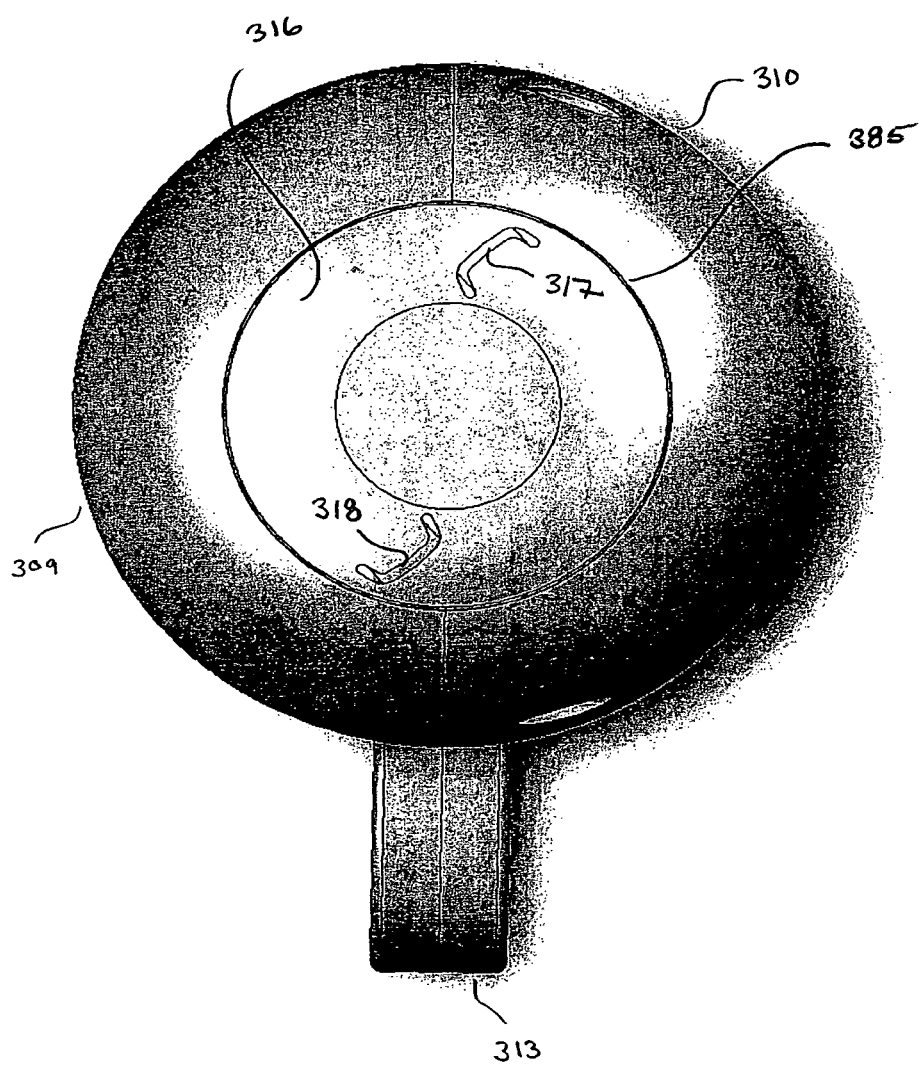
FIG. 16 is a front view of the line-handling apparatus of FIG. 14.

FIG. 16 is a front view of the leash apparatus 300. A faceplate 316 can be located at the distal end of the housing, i.e., the end of the housing that in use is closest to the pets that are being walked by the leash user. Faceplate 316 can contain a first leash passage 317 and a second leash passage 318, through which a first leash (not shown) and a second leash (not shown) pass.

Figure 17:
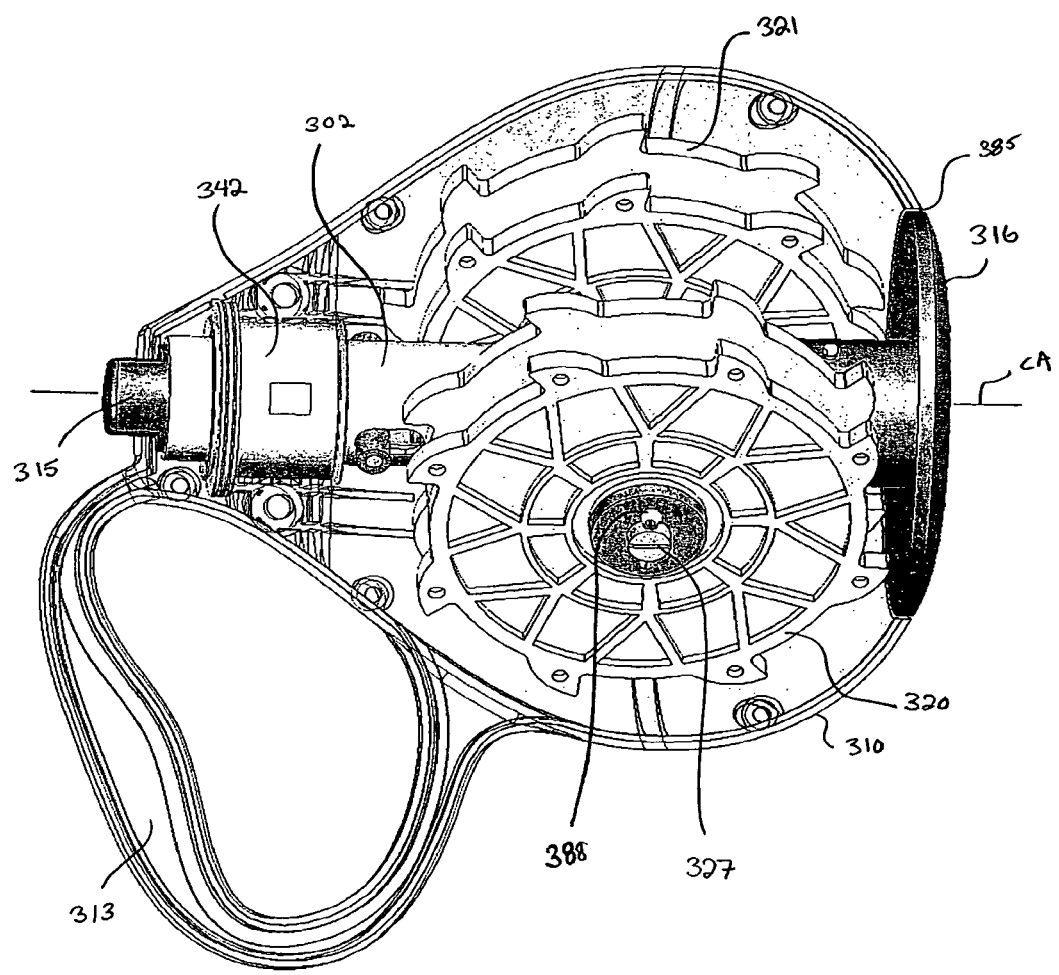
FIG. 17 is a side view of the line-handling apparatus of FIG. 14, shown with a portion of the housing removed to reveal the internal components.
Figure 18:
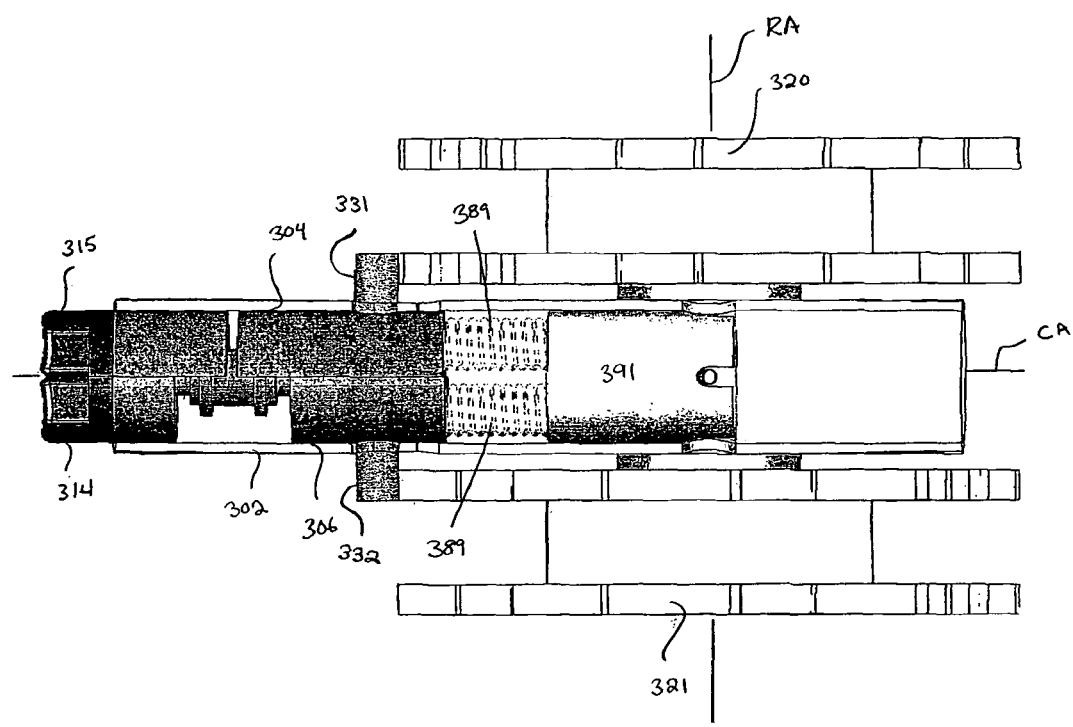
FIG. 18 is a top view of the line-handling apparatus of FIG. 14, shown with the housing and other components removed for clarity.

FIG. 17 is a side view of the leash apparatus 300, shown with the first housing half section 309 removed to reveal internal components. FIG. 18 is a top view of the internal components of the leash apparatus 300, with the support shaft shown in phantom for illustrative purposes. The leash apparatus 300 can include a rotatable subassembly generally including the support shaft 302, a first sliding brake member 304 (see FIG. 18), a second sliding brake member 306 (see FIG. 18), a first reel assembly 320, and a second reel assembly 321. The subassembly can rotate within the housing about a shaft axis CA. According to an illustrative embodiment, a bearing ring 342 can facilitate rotation between the subassembly and the housing, as shown in FIG. 17. For example, the bearing ring 342 can include an inner race mounted to the support shaft 302, and an outer race sandwiched between the first and second housing half sections 309, 310, thereby providing rotation between the support shaft 302 (and the components mounted thereto), and the housing. Additionally or alternatively, the face plate 316 can be secured to the distal end of the support shaft 302, and can interface with a distal aperture 385 in the distal end of the housing to support the support shaft 302 within the housing. One of ordinary skill in the art will appreciate, however, that other structures can be utilized to rotatably mount the subassembly and/or support shaft 302 within the housing.

Figure 19:
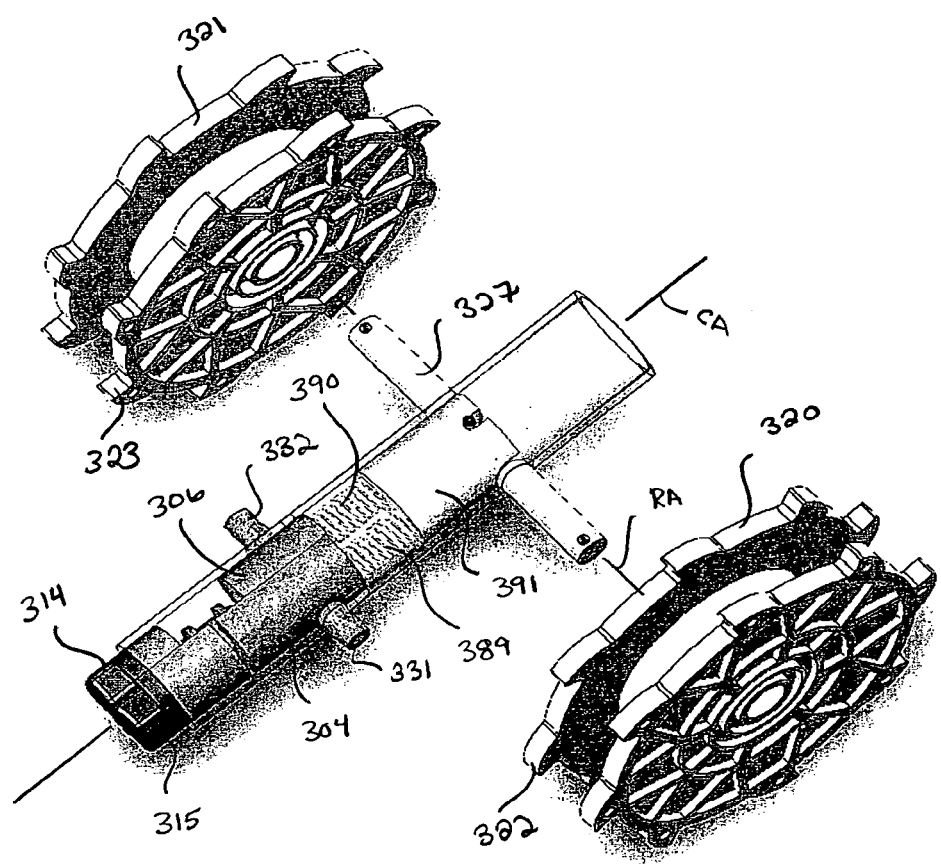
FIG. 19 is a partially-exploded, perspective view of some of the internal components of the line-handling apparatus of FIG. 14.

According to the illustrative embodiment shown in FIGS. 18 and 19, the first reel assembly 320 and the second reel assembly 321 can be mounted to the support shaft 302 by a common axle 327 (shown in FIG. 19), which can extend through the support shaft 302. The common axle 327 can define a reel axis RA (shown in FIG. 18) about which the first and second reel assemblies 320, 321 rotate. The reel axis RA can be angled with respect to the shaft axis CA, for example, it can be substantially transverse thereto, as shown in FIGS. 18 and 19. According to an alternative embodiment, the common axle 327 can be substituted with individual axles, as described above in connection with the embodiments shown in FIGS. 1-13 of the present invention.

The first reel assembly 320 can rotatably mount on the common reel axle 327 using a bearing, bushing, or other structure known in the art. A retainer pin 388 extending through the axle 327 (as shown in FIG. 17), or other retaining mechanism can be used to secure the first reel assembly 320 to the reel axle 327. The second reel assembly 321 can mount rotatably on the reel axle 327 in a similar manner. One of ordinary skill in the art will appreciate, however, that other structures can be utilized to rotatably mount the first and second reel assemblies 320, 321 to the reel axle 327. Each reel assembly 320, 321 can include an independent rewind spring (not shown) that serves to rewind its respective leash (not shown) onto the reel assembly when the leash is sufficiently slack.

According to another illustrative aspect of the invention, the leash apparatus 300 can include a brake mechanism that operates independently on each reel assembly 320, 321. For example, referring to FIG. 19, a first sliding brake member 304 and a second sliding brake member 306 can be mounted to the support shaft 302 such that the first and second sliding brake members 304, 306 can slide along the support shaft 302 independently of one another. In the illustrative embodiment shown, each sliding brake member 304, 306 can have a semi-circular cross section, and the support shaft 302 can have a hollow interior that receives the brake members 304, 306, however other configurations are possible, as will be appreciated by one of ordinary skill in the art.

Still referring to FIG. 19, each sliding brake member 304, 306 can include a brake catch 331, 332, respectively. As shown, the first brake catch 331 can extend through an elongated aperture in the support shaft 302, and the second brake catch 332 can similarly extend through an elongated aperture in the support shaft 302. Each reel assembly 320, 321 can include a plurality of brake teeth 322, 323, which are adapted to engage the respective brake catches 331, 332 to prevent rotation of the respective reel assemblies 320, 321 around the axle 327. In the illustrative embodiment shown, the sliding brake members 304, 306 can slide within the hollow interior of the support shaft 302 (e.g., along the shaft axis CA), thereby moving the brake catches 331, 332 toward and away from the corresponding brake teeth 322, 323. A first return spring 389 can extend between a brake block 391 located in the support shaft 302, and the first sliding brake member 304 to bias the first sliding brake member 304 away from the first reel assembly 320. A second return spring 390 can extend between the brake block 391 and the second sliding brake member 306 to bias the second sliding brake member 306 away from the second reel assembly 321. Accordingly, the reel assemblies 320, 321 can rotate freely, unless the user actuates one or both of the brake members 204, 206 to stop them.

According to an illustrative embodiment, when the first brake catch 331 engages one or more of the first brake teeth 322 on the first reel assembly 320, the first reel assembly 320 is substantially prevented from rotation about the reel axis, but the second reel assembly 321 is still free to rotate about the reel axis RA. Similarly, when the second brake catch 332 engages one or more of the second brake teeth 323 on the second reel assembly 321, the second reel assembly 321 is substantially prevented from rotation about the reel axis RA, but the first reel assembly 320 is still free to rotate about the reel axis RA. When the first brake catch 331 and the second brake catch 332 simultaneously engage one or more of the respective brake teeth 322, 323, both the first reel assembly 320 and the second reel assembly 321 are substantially prevented from rotation about the reel axis RA. According to an illustrative embodiment, the support shaft 302 can rotate within the housing about the shaft axis CA regardless of whether the first brake catch 331 or the second brake catch 332 is engaged with the respective first brake teeth 322 or second brake teeth 323.

To brake the second reel assembly 321, the inner brake rod button 314 can be depressed by a user to move the second sliding brake member 306 via an inner brake rod 361 (shown in FIGS. 20 and 21), without moving the first sliding brake member 304. Similarly, to brake the first reel assembly 320, the outer brake rod button 315 can be depressed by a user to move the first sliding brake member 304 via an outer brake rod 360 (shown in FIGS. 20 and 21), without moving the second sliding brake member 306. Referring back to FIG. 14, the inner brake rod button 314 and the outer brake rod button 315 may be prevented from rotating with respect to the housing (e.g., about the shaft axis), for example, by having shapes that interlock with the housing. Accordingly, in an illustrative embodiment, the inner brake rod button 314 and the outer brake rod button 315 may rotate with respect to the first sliding brake member 304 and the second sliding brake member 306, respectively. Therefore, when the rotatable subassembly (including support shaft 302) rotates within the housing, the inner and outer brake rod buttons 314, 315 can remain in a fixed position with respect to the housing, for example, by rotating with respect to the subassembly, as will be described in more detail with respect to FIGS. 20 and 21.

Figure 20:
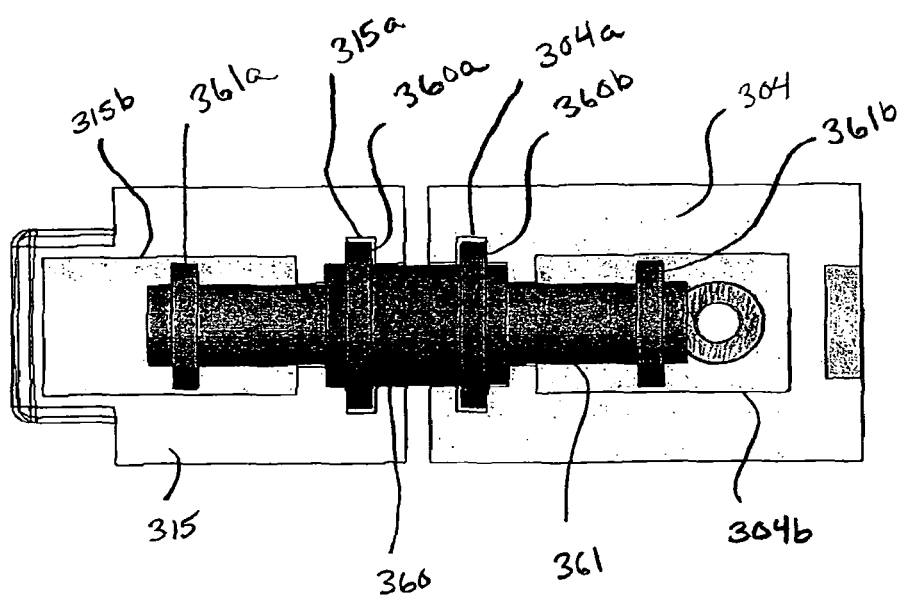
FIG. 20 is a side view of an illustrative first actuation member, first brake, inner brake rod, and outer brake rod of the line-handling apparatus of FIG. 14.
Figure 21:
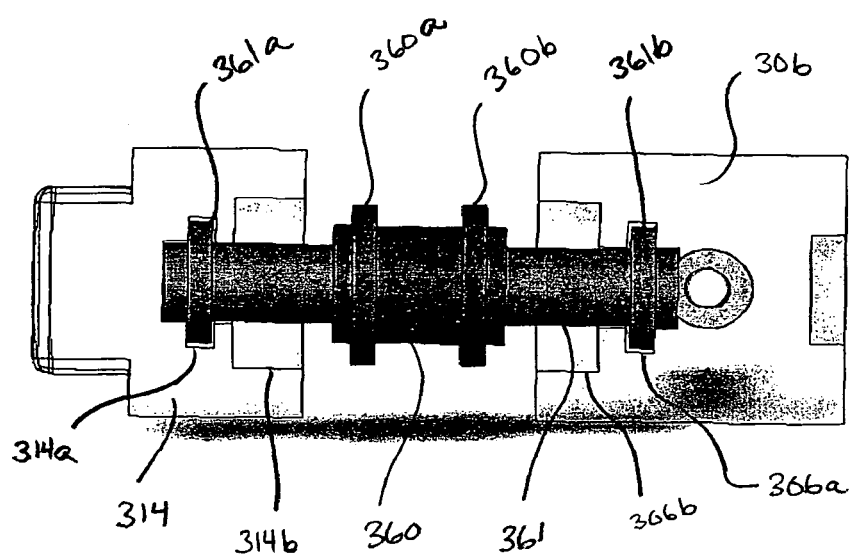
FIG. 21 is a side view of an illustrative second actuation member, second brake, inner brake rod, and outer brake rod of the line-handling apparatus of FIG. 14.

Referring to FIG. 20, the outer brake rod button 315 can be attached to the first sliding brake member 304 via the outer brake rod 360. For example, the outer brake rod 360 can include a first outer brake rod head 360a adapted to engage a socket 315a in the outer brake rod button 315, and a second outer brake rod head 360b adapted to engage a socket 304a in the first sliding brake member 304. Accordingly, axial movement of the outer brake rod button 315 can translate into axial movement of the first sliding brake member 304. Referring to FIG. 21, the inner brake rod button 314 can be attached to the second sliding brake member 306 in a similar manner. For example, the inner brake rod 361 can include a first inner brake rod head 361a adapted to engage a socket 314a in the inner brake rod button 314, and a second inner brake rod head 361b adapted to engage a socket 306a in the second sliding brake member 306. Accordingly, axial movement of the inner brake rod button 314 can translate into axial movement of the second sliding brake member 306.

Referring back to FIG. 20, the outer brake rod button 315 can define a cavity 315b adapted to slidably receive the first inner brake rod head 361a, and/or the first sliding brake member 304 can define a cavity 304b adapted to slidably receive the second inner brake rod head 361b. Accordingly, axial movement of the outer brake rod button 315 does not translate into axial movement of the first sliding brake member 304. In a similar manner, as shown in FIG. 21, the inner brake rod button 314 can define a cavity 314b adapted to slidably receive the first outer brake rod head 360a, and/or the second sliding brake member 306 can define a cavity 306b adapted to slidably receive the second outer brake rod head 360b. Accordingly, axial movement of the inner brake rod button 314 does not translate into axial movement of the second sliding brake member 306. Due to the concentric arrangement of the outer and inner brake rods 360, 361 in the illustrative embodiment shown in FIGS. 20 and 21, the inner and outer brake rod buttons 314, 315 can rotate with respect to the first and second sliding brake members 304, 306, for example, about shaft axis CA. One of ordinary skill in the art will appreciate, however, that other structures and techniques can be used to couple the inner and outer brake rod buttons 314, 315 to the first and second sliding brake members 304, 306, respectively.

It is recognized that additional embodiments of the multi-reel line-handling device can be used for purposes other than preventing entanglement of pet leashes. For example, it is contemplated that the apparatus of the invention could be used to prevent entanglement of lines fastened to two or more children, two or more fishing lines, two or more kite strings, two or more glider towlines or two or more water ski towlines. The apparatus of the invention could also be used to prevent twisting of two or more lines in a variety of other situations where tow lines or support lines are used. For some of these applications, connection means between the brake rod triggers and the brake rods could be mechanical, electrical, hydraulic, or pneumatic. In addition, reel return rotation and split-shaft member movement could be accomplished using electric, hydraulic, pneumatic, or other means instead of, or in addition to, return springs.

While some embodiments of the invention have been illustrated and described in detail herein, the same is considered illustrative and not restrictive in character, it being understood that only the preferred embodiments have been shown and described and that all changes and modifications that come within the spirit of the invention are desired to be protected.

The invention claimed is:

1. A multi-reel, line-handling apparatus, comprising:
a housing;
a handle coupled to the housing;
a first reel located within the housing, the first reel rotatable about a first reel axis;
a second reel located within the housing, the second reel rotatable about a second reel axis;
a first brake;
a second brake movable independently of the first brake;
a first actuation member located exterior to the housing, the first actuation member adapted to move the first brake and the first reel into engagement with one another;
a second actuation member located exterior to the housing, the second actuation member adapted to move the second brake and the second reel into engagement with one another;
a first brake rod connecting the first actuation member to the first brake such that sliding of the first actuation member imparts corresponding sliding to the first brake; and
a second brake rod extending through at least a portion of the first brake rod, the second brake rod connecting the second actuation member to the second brake such that sliding of the second actuation member imparts corresponding sliding to the second brake, wherein at least a portion of the first brake rod is coaxial with a portion of the second brake rod about an axis substantially perpendicular to the first reel axis and the second reel axis;
wherein the first brake and the first reel are movable into engagement with one another to stop rotation of the first reel while the second brake remains disengaged from the second reel to allow rotation of the second reel, and the second brake and the second reel are movable into engagement with one another to stop rotation of the second reel while the first brake remains disengaged from the first reel to allow rotation of the first reel.

2. The apparatus of claim 1, further comprising:
at least one elastic member biasing the first brake and the first reel out of engagement from one another and biasing the second brake and the second reel out of engagement from one another.

3. The apparatus of claim 1, further comprising:
a first brake rod head located on the first brake rod;
a second brake rod head located on the second brake rod;
a first brake rod head socket located in the first brake, the first brake rod head socket adapted to fixedly engage the first brake rod head to the first brake;
a first brake rod head cavity located in the first brake, the first brake rod head cavity adapted to slidably receive the second brake rod head;
a second brake rod head socket located in the second brake, the second brake rod head socket adapted to fixedly engage the second brake rod head to the second brake; and
a second brake rod head cavity located in the second brake, the second brake rod head cavity adapted to slidably receive the first brake rod head.

4. The apparatus of claim 1, further comprising a shaft rotatably supporting the first reel and the second reel, wherein the shaft defines a shaft axis, and the first brake and the second brake are slidable substantially parallel to the shaft axis.

5. The apparatus of claim 1, wherein at least one of the first actuation member and the second actuation member comprises a trigger.

6. The apparatus of claim 1, wherein at least one of the first actuation member and the second actuation member comprises a push button.

7. The apparatus of claim 1, wherein the first reel includes a plurality of first brake teeth adapted to engage the first brake, and the second reel includes a plurality of second brake teeth adapted to engage the second brake.

8. The apparatus of claim 1, further comprising:
a shaft located within the housing, the shaft defining a shaft axis angled with respect to the first reel axis and the second reel axis, wherein the first reel and the second reel are mounted to the shaft, and the shaft, the first reel, and the second reel are rotatable within the housing about the shaft axis as a subassembly.

9. The apparatus of claim 8, further comprising:
a faceplate connected to the shaft, the faceplate having a first line aperture and a second line aperture;
wherein the housing defines a frontal opening, and the faceplate covers the frontal opening.

10. The apparatus of claim 1, further comprising:
a first line having a first end coupled to the first reel, and a second end located exterior to the housing; and
a second line having a first end coupled to the second reel, and a second end located exterior to the housing.

11. A multi-reel, line-handling apparatus, comprising:
a handle adapted to be gripped by a user;
a housing coupled to the handle;
a first reel located within the housing, the first reel rotatable about a first reel axis;
a second reel located within the housing, the second reel rotatable about a second reel axis, wherein the first reel and the second reel are rotatable with respect to the handle about a third axis substantially transverse to the first reel axis and the second reel axis;
a first brake movable into engagement with the first reel;
a second brake movable into engagement with the second reel;
a first actuation member located proximate to the handle, the first actuation member user operable to move the first brake into engagement with the first reel to stop the first reel while the second brake remains disengaged from the second reel;
a second actuation member located proximate to the handle, the second actuation member user operable to move the second brake into engagement with the second reel to stop the second reel while the first brake remains disengaged from the first reel;
a first brake rod coupling the first actuation member to the first brake whereby sliding of the first actuation member imparts sliding movement to the first brake, and
a second brake rod coupling the second actuation member to the second brake whereby sliding of the second actuation member imparts sliding movement to the second brake, wherein the first brake rod and the second brake rod are at least partially coaxial with one another along the third axis.

12. The apparatus of claim 11, wherein the first brake rod is at least partially nested within the second brake rod.

* * * * *